B. F. LARE.
TIRE FOR VEHICLE WHEELS.
APPLICATION FILED SEPT. 30, 1910.
1,015,035.
Patented Jan. 16, 1912.
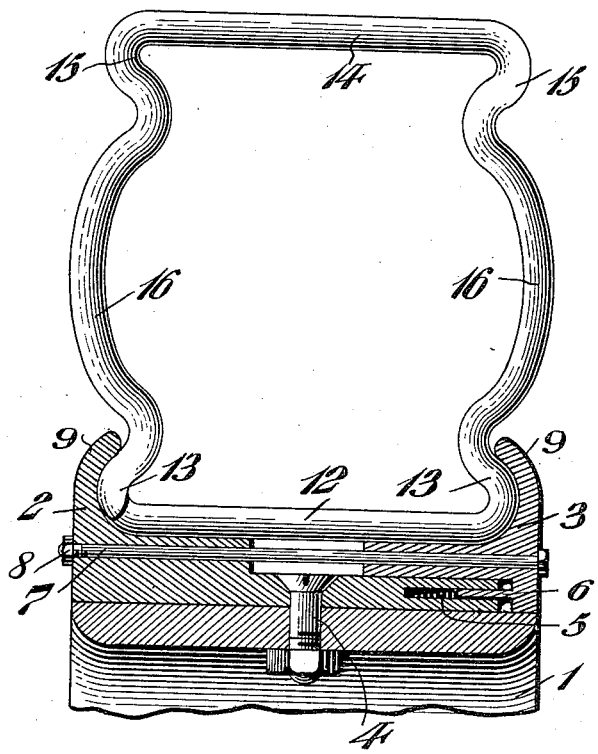
WITNESSES
INVENTOR
Benjamin F. Lare.
BY
Wiedersheim & Fairbanks
ATTORNEYS

UNITED STATES PATENT OFFICE.

BENJAMIN F. LARE, OF PHILADELPHIA, PENNSYLVANIA.

TIRE FOR VEHICLE-WHEELS.

1,015,035.  Specification of Letters Patent.  Patented Jan. 16, 1912.

Application filed September 30, 1910. Serial No. 584,658.

*To all whom it may concern:*

Be it known that I, BENJAMIN F. LARE, a citizen of the United States, residing in the city and county of Philadelphia, State of Pennsylvania, have invented a new and useful Tire for Vehicle-Wheels, of which the following is a specification.

This invention relates to vehicle tires and more particularly to a tire for use in connection with bicycles, automobiles or the like and has for an object to produce a tire which is sufficiently resilient to reduce to a minimum the effect of the inequalities in the road bed whereby the jars and shocks are not transmitted to the vehicle and which is also puncture proof and does not depend upon air as a cushioning medium.

Heretofore various pneumatic tire structures have been devised, as I am aware, but all of them are open to the objection of being easily punctured by nails, tacks or other sharp objects whereby they are temporarily or permanently rendered useless.

In my present invention, I have devised a tire formed of convolutions of spring material, each with a plurality of tread and rim engaging surfaces with offsets and clamping means, adapted to engage the offset on each side of the surfaces which is positioned to engage the rim.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various parts of which my invention consists can be variously arranged and organized and that my invention is not limited to the precise arrangement and organization of these parts as herein shown and described.

The figure represents a sectional elevation of a tire embodying my invention attached to a vehicle rim.

Referring to the drawings:—1 designates the felly of a suitable vehicle wheel, the same in the present instance having secured thereto, rim sections 2 and 3, each of which extends about the peripheral surface of the felly 1 and forms a complete device adapted to receive and secure a suitable tire. The rim section 2, in the present instance, is fixedly secured to the felly 1 by means of studs 4 or like fastening means, suitably spaced apart and positioned about the circumference of the felly in any well known manner.

5 designates a slot suitably formed in the rim section 2 with which coöperates a tongue 6, preferably formed integral with the rim section 3 and by means of which a telescopic connection is formed between the two rim sections whereby the two rim sections form a complete unitary rim when secured together in operative position. The securing means for the rim sections in the present instance consists of rods 7 passing through the rim sections 2 and 3 from one side to the other and uniting them by means of the nut 8, it being of course understood that there are a plurality of these rods positioned about the rim. Each rim section is provided with an inwardly turned lip 9 whereby a circumferential channel is formed about the rim and in which a portion of the tire is adapted to fit thus uniting the rim and tire structure.

The tire in the present instance consists of convolutions of spring material, each of which is provided with the preferably flat horizontally disposed surfaces 12 and 14, oppositely situated in order that one may serve as the rim engaging surface when the other serves as the tread surface. As shown the portion 12 is the rim engaging surface while the portion 14 serves as the tread portion of the convolution, but as this is reversible, when the portion 14 becomes worn it may be turned so that it may be fitted in the rim sections 2 and 3 and the other surface 12 may be substituted to receive the wear.

In order to secure the convolutions in position I provide projecting offsets at the surface which is positioned to engage the rim, and as here shown I form the offsets 13 adjacent the portion 12, said offsets being adapted to conform to the inner surface of the lips 9 whereby when the parts are in attached position the tire is firmly held against displacement. I have also shown the offsets 15 adjacent the portion 14 which offsets are adapted to be engaged by the lips 9 when the portion 14 is turned to engage the rim section. The portions 16 of the convolutions are here shown as curved to afford a yielding movement.

It will now be apparent that I have devised a complete unitary tire structure wherein the desired resilient qualities are embodied and in which the disadvantages due to puncturing, are eliminated and trouble of a like nature dispensed with.

Having thus described my invention, what I claim as new and desire to secure by Letters Patent, is:—

1. A spring section for a tire consisting of a convolution of spring material having a plurality of surfaces, either surface serving as a tread or rim engaging surface, and one serving as the tread when the other is positioned to engage the rim, off-sets upon opposite sides of each surface, and clamping means adapted to engage the off-set on each side of the surface which is positioned to engage the rim.

2. A tire formed of convolutions of spring material each having a plurality of flattened surfaces, either surface serving as a tread or a rim engaging surface, and one serving as the tread when the other is positioned to engage the rim, off-sets upon opposite sides of each surface, and clamping means adapted to engage the exterior of an off-set on each side of the surface which is positioned to engage the rim.

BENJAMIN F. LARE.

Witnesses:
C. D. McVay,
F. A. Newton.

Copies of this patent may be obtained for five cents each, by addressing the "Commissioner of Patents, Washington, D. C."